W. R. CARROLL.
SUPPORT FOR DRAW CUT SHAPER SLIDES.
APPLICATION FILED MAY 25, 1910.
1,002,805.
Patented Sept. 5, 1911.
2 SHEETS—SHEET 1.
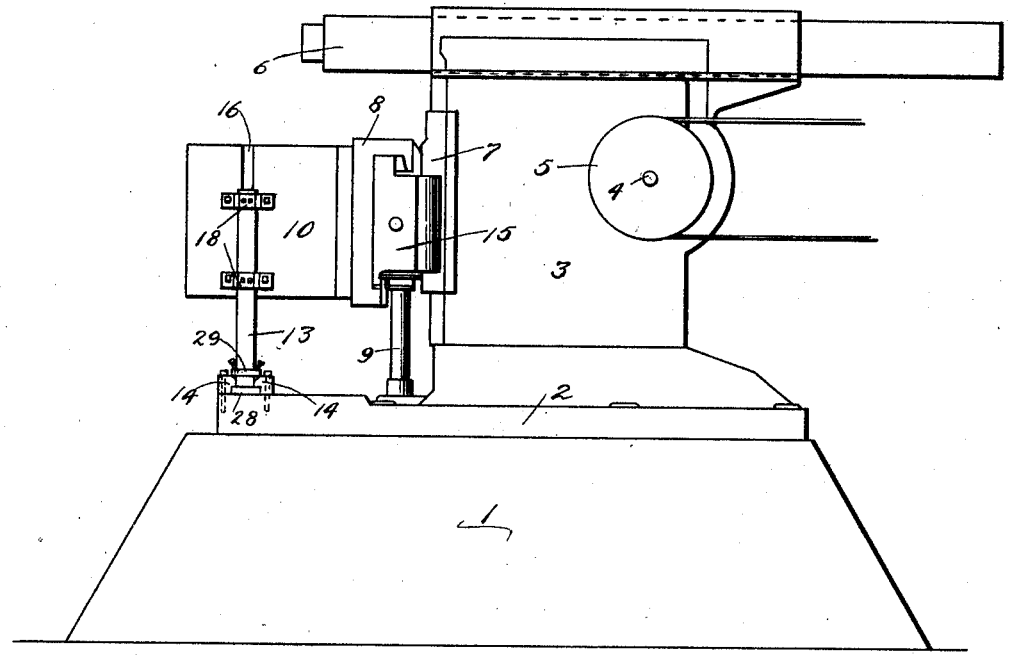
Fig. 1
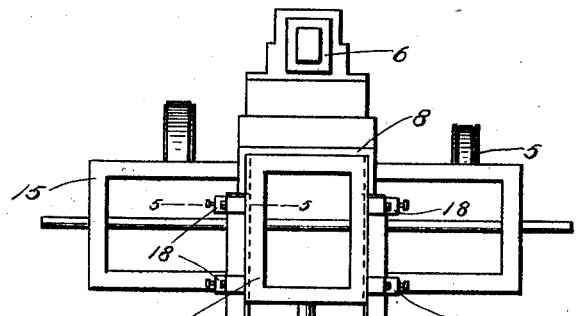
Fig. 2
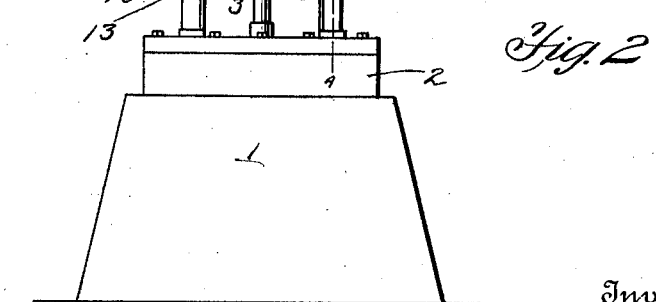
Witnesses
N. Abramson
S. White
Inventor
W. R. Carroll
By Geo. W. Sues.
Attorney
COLUMBIA PLANOGRAPH CO., WASHINGTON, D. C.

W. R. CARROLL.
SUPPORT FOR DRAW CUT SHAPER SLIDES.
APPLICATION FILED MAY 25, 1910.
1,002,805.
Patented Sept. 5, 1911.
2 SHEETS—SHEET 2.
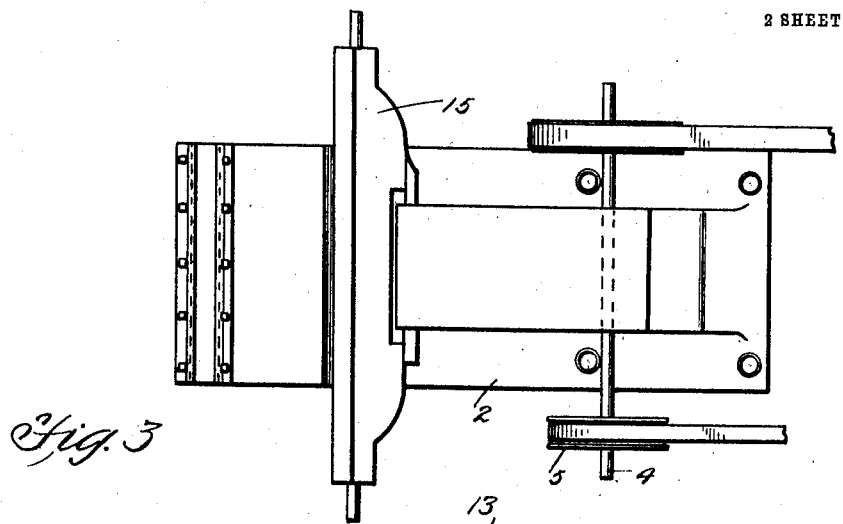
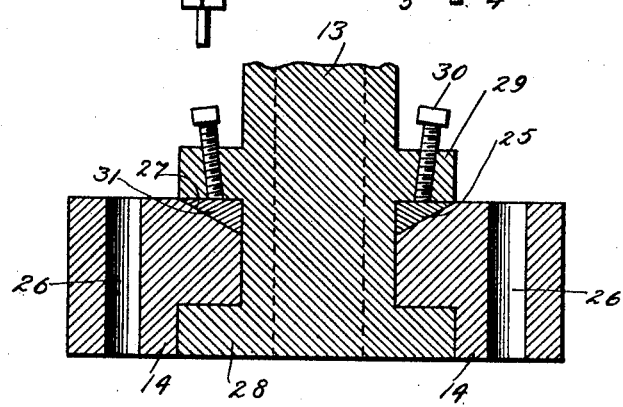
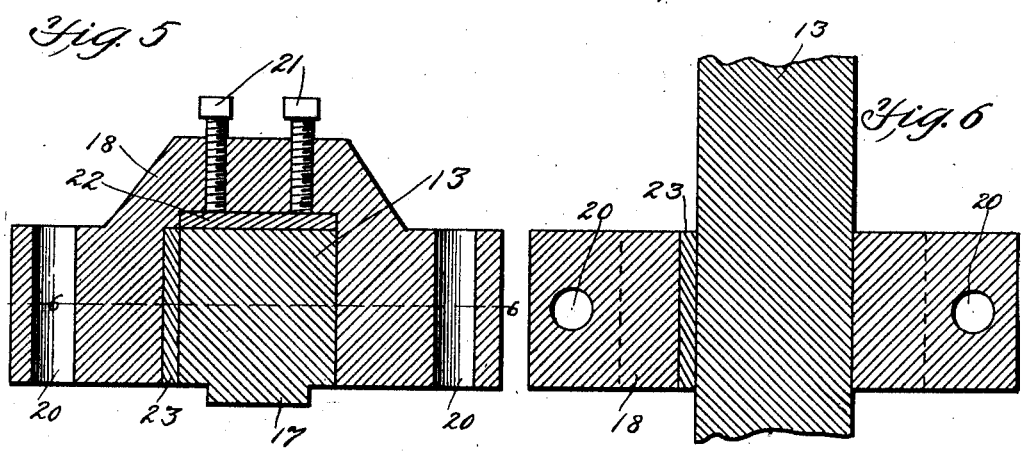
Witnesses
N. Abramson
S. White
Inventor
W. R. Carroll
By Geo. W. Sues
Attorney

UNITED STATES PATENT OFFICE.

WILLIAM R. CARROLL, OF ROANOKE, VIRGINIA, ASSIGNOR OF ONE-HALF TO BENJAMIN V. MAXWELL, OF WASHINGTON, DISTRICT OF COLUMBIA.

SUPPORT FOR DRAW-CUT-SHAPER SLIDES.

1,002,805.   Specification of Letters Patent.   Patented Sept. 5, 1911.

Application filed May 25, 1910. Serial No. 563,452.

*To all whom it may concern:*

Be it known that I, WILLIAM R. CARROLL, a citizen of the United States, and a resident of Roanoke, in the county of Roanoke and State of Virginia, have invented certain new and useful Improvements in Supports for Draw-Cut-Shaper Slides, of which the following is a specification, reference being had to the accompanying drawings.
This invention relates to improvements in supports for draw-cut shaper slides.

The primary object of my invention is to provide the slide or table of a draw-cut shaper with a support which will hold a slide or table absolutely rigid under all working strains.

Another object is to provide a draw-cut shaper slide or table with a support permitting the ready lowering or raising of the table without adjusting the support.

A further object is to provide the table or slide of a draw-cut shaper with a support or foot rest, so arranged that the table may be given a vertical or horizontal adjustment and be rigidly supported to withstand the strain of a heavy cut.

With these and other objects in view, the present invention consists in the combination and arrangement of parts as will be hereinafter more fully described and particularly pointed out in the appended claims, it being understood that changes in the specific structure shown and described may be made within the scope of the claims, without departing from the spirit of the invention.

In the drawings forming a part of this specification, and in which like numerals of reference indicate similar parts in the several views:—Figure 1, shows an elevational view of a draw-cut shaper with parts removed, the slide or table of which is held by means of a support embodying my invention. Fig. 2, shows a front, elevational view of a draw-cut shaper equipped with my support. Fig. 3, shows a top view disclosing the runway as used in my invention. Fig. 4, shows a fragmentary, sectional view, disclosing the foot of one of the supports taken on the line 4—4, of Fig. 2. Fig. 5, is a section on line 5—5, of Fig. 2. Fig. 6, is a fragmentary sectional view, longitudinally through one of the supports and connected brackets taken on the line 6—6, of Fig. 5.

As ordinarily constructed the slides or tables of draw-cut shapers are given support by means of posts or bars, to which the table or slide is secured, after the proper level or adjustment has been obtained. In certain forms of shapers, however, the outer end of the slide or table is not sufficiently braced, so that when the shaper is subjected to heavy working strains the table or slide has a tendency to spring out of its normal position. In my present invention I provide a table or slide with an auxiliary support, by means of which the table may be rigidly held in such a manner, however, that the same can be given a vertical or horizontal adjustment to meet the requirements of the work.

In the accompanying drawings, numeral 1 designates the foundation, and 2 the base of a draw-cut shaper 3, of usual construction, provided with driving shaft 4, carrying the driving pulley 5. In Fig. 1 the tool carrying member of the shaper is marked 6, while the slide carrying element as usually employed in shaper construction is marked 7. This member 7 permits the table or slide 10 to be vertically adjusted, while the member 8 carried upon the bar 15 permits a horizontal adjustment of the slide 10. In Fig. 1 the outline of the shaper represents a well known make, the slide or table 10 of which is not provided with any supporting means outside of the post 9, which supports the bar 15, as shown in Figs. 1 and 2. As shown in Fig. 1, the slide 10 is provided with the groove 16, there being a groove at each end, within which groove is slidably held a support 13, in the form of a square bar, having the vertical, outstanding rib 17, being arranged for co-action with the groove 16.

In order to slidably hold the supporting post 13 to the slide or table, I employ two small brackets 18, each bracket having two bolt openings 20, by means of which the brackets are secured to the table. Each bracket 18 is further provided with two set screws 21, as shown in Fig. 5, these said screws working against and upon a pinch plate 22, to insure a firm engagement of the supporting post 13 with the bearing bracket. Adjacent to the pinch plate 22 and held at right angles thereto, is the jib 23, by means of which any lost motion or wear of the parts may be taken up. By means of the set screws 21, the bearing brackets may be securely locked to the posts 13. In their loose or unset condition the screws 21 permit the table or slide 10 to readily work upon the members 13.

In order to securely hold the supporting posts 13 to the base 2 of the shaper, I employ two equiformed rail members 14, shown in detail in Fig. 4, each rail having an inwardly directed bevel edge web 25, these rails being provided with the bolt openings 26.

Slidably held between the rails 14 and below the webs 25 are the foot enlargements 28 of the supporting posts 13, as clearly shown in Fig. 4. At a suitable point above the rails 14, each post 13 is provided with a flange 29, these flanges carrying the set screws 30. Held below the flanges 29 and working upon the oblique surface 27 of the rails are the jibs 31, upon which the set screws 30 work in the manner disclosed. By means of the set screws 30, the supporting posts 13 can be locked to the guide rails when that is desired.

From the foregoing it will be seen that when the set screws are loose, the table or slide can be given any desired horizontal or vertical adjustment, and that by means of the set screws 21 and 30 the slide or table may be securely fastened.

The attachment of the brackets 18 and the rails 14 is effected in any suitable workmanlike manner.

An incident of convenience to this arrangement of supports is that as long as the set screws are loose, the slide or table can be given any adjustment and at the same time be rigidly held, while by means of said screws a table or slide is effectively locked.

A support for draw-cut shapers constructed according to my invention is simple, inexpensive in construction, and both durable and efficient in operation, and the table adjustments may be made with ease, accuracy and despatch.

Having thus described my said invention, what I claim as new and desire to secure by United States Letters Patent, is:

1. In a support of the class described, the combination with a shaper table; of brackets secured to opposite sides of the table, set screws carried by said brackets, posts slidably engaged in said brackets, said screws engaging said posts and means for compensating for wear of the parts.

2. The combination with a shaper-table; of brackets secured to said table, posts slidable vertically through said brackets, set screws carried by said brackets and adapted for engagement with said posts, horizontally disposed rails adapted for engagement with said posts and means for securing said posts to said rails.

3. The combination with a shaper table, of a bracket, a post slidably held within said bracket, means to secure said post within said bracket, a rail having outstanding webs, said post having an enlarged foot held below said webs, and means to secure said post to said webs.

4. The combination with a shaper table of two oppositely positioned rails having inwardly directed webs, and a post having an enlarged foot held below said webs, and a flange held above said web, set screws within said flanges for engagement with said web, a slide, and a bracket carried by said slide engaging said post.

5. The combination with a shaper table, of a bracket, a set screw carried by said bracket, a post, said set screw engaging said post, two oppositely positioned rails having inwardly directed webs, said post having an enlarged foot held below said webs, and a flange held above said webs, a set screw carried by said flange for engagement with said webs.

6. A support for shaper slides, comprising the combination with a table having grooves; of brackets, posts having webs engaged with the grooves, means carried by said brackets to engage said posts, slotted rails slidably engaging said posts and means to adjustably secure the rails to the posts.

7. A support as described, comprising the combination with a shaper table; of brackets, posts slidably and adjustably engaged in the brackets, horizontally disposed rails engaged with the posts and means to secure the posts adjustable to the rails.

In testimony whereof I affix my signature, in presence of two witnesses.

WILLIAM R. CARROLL.

Witnesses:
H. F. GREENWOOD,
E. F. RICHARDSON.

---

Copies of this patent may be obtained for five cents each, by addressing the "Commissioner of Patents, Washington, D. C."